Dec. 14, 1948.    A. GIANNOPULOS    2,456,400
IRRIGATION PIPE AND METHOD OF CONSTRUCTING SAME
Filed Dec. 11, 1945
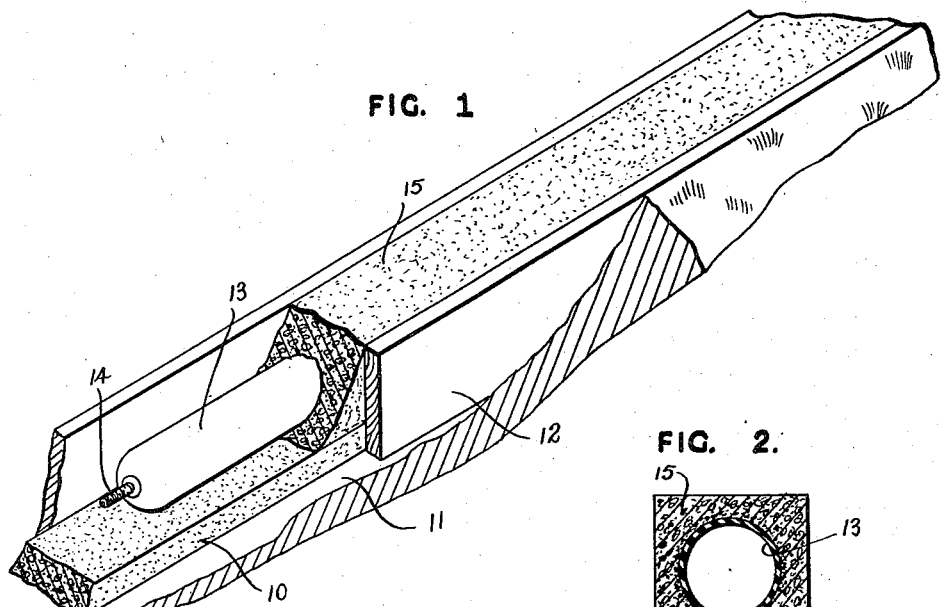
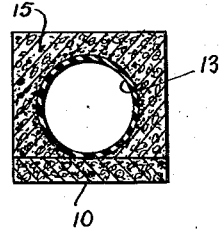
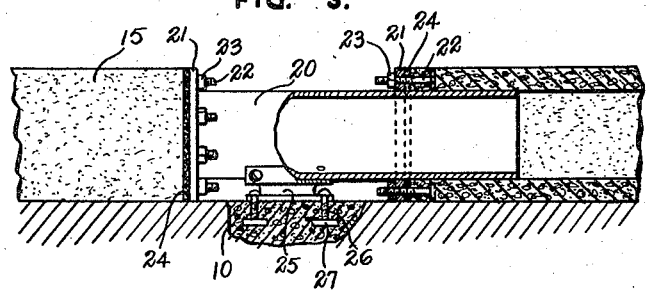
Inventor
ALEXANDER GIANNOPULOS,
Attorneys Patented Dec. 14, 1948

2,456,400

UNITED STATES PATENT OFFICE 2,456,400

IRRIGATION PIPE AND METHOD OF CONSTRUCTING SAME

Alexander Giannopulos, Fresno, Calif.

Application December 11, 1945, Serial No. 634,233

2 Claims. (Cl. 138—80)

This invention relates to an irrigation pipe, and the method of constructing the same.

A primary object of this invention is the provision of an improved cement irrigation pipe characterized by impermeability to water passed therethrough.

An additional object of the invention is the provision of an improved method of constructing such an irrigation pipe, whereby the interior thereof is substantially sealed against the egress of fluid, and whereby the pipe comprising the finished article of manufacture suitably serves for all irrigation and other fluid transmission purposes.

A still further object of the invention is the provision of an improved method of making such a pipe characterized by extreme simplicity, reliability and effectiveness and a finished article of high quality suitable for the purposes described.

Other objects reside in the combinations of elements, arrangements of parts, and the steps and method appropriate to the process of constructing the device.

Still other objects will in part be obvious and in part be pointed out hereinafter, and disclosed in the accompanying drawings, wherein there is shown a preferred embodiment of this inventive concept.

In the drawings:

Figure 1 is a perspective view, partially in elevation and partially in section disclosing one form of pipe embodying features of the instant invention, and illustrating certain elements and steps in the fabrication thereof.

Figure 2 is a transverse sectional view through the finished pipe comprising a feature of the instant invention, the core thereof being indicated in place prior to removal of the same.

Figure 3 is a side view, partially in elevation and partially in section, disclosing an expansion joint adapted to be utilized in connecting sections of the pipe.

Having reference now to the drawings, wherein similar reference characters refer to similar parts throughout the several views, there is generally indicated at 10 a base of cement, concrete, or the like, embedded preferably in a suitable ditch or excavation 11 in the earth. After the base 10 has been laid, in the construction of the device, side boards 12 are positioned adjacent thereto, and a tubular rubber bladder 13, of a desired length and provided with an air inlet valve 14, is positioned on the base 10.

In the process of the instant invention, the coring or tube 13, which is preferably of inflatable rubber or similar material, is adapted to be coated with any gluey solution adapted to admix with a cementitious mixture or material. The coring 13 is suitably aligned in position on the base 10 and a dry powdered cement is poured thereover. Water is provided and the coring is agitated in any desired manner, either manually or mechanically, as may be desired. The dry cement engaging with the gluey or gelatinous substance applied to the exterior of the coring forms a fine, smooth and coreless finish, which is substantially leakproof. The cementitious material 15, after it has formed an initial coating on the outside of the coring 13, may be reinforced in any desired manner and built up between the side boards 12 to form a substantially rectangular pipe member, as disclosed in Figure 2. Obviously, other configurations may be utilized if desired.

After the piping has been formed, and before the same has dried, it is considered preferable to displace the coring 13 and remove the same from the interior of the device, thus providing a substantially tubular conduit characterized by a substantially impervious coreless inner surface comprised of the cement powder in coaction with the gluey substance with which the core is coated.

As best shown in Figure 3, suitable expansion joints between adjacent sections of the piping may be provided and take the form of tubular metallic members 20, provided with end flanges 21 secured, as by bolts 22 and nuts 23, to end flanges 24 secured to adjacent sections of the concretious pipe 15.

The tubular members 20 may be secured to lugs 25 which may be engaged, as by bolts 26 and base plates 27, in the base 10 of the assembly.

Obviously, the pipe sections may be made in any desired length and of any desired size, in accordance with the size of the coring 13, and as desired for individual installation. Correspondingly, the expansion joints 20 may be made of any desired length in order to provide the maximum efficiency in results.

From the foregoing it will now be seen that there is herein provided an improved concretious irrigation pipe and method of manufacturing and assembling the same which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:
1. In concrete conduit of the continuous type, the combination, which comprises a continuous concrete base slab providing a permanent foundation, a square conduit with a circular opening extending longitudinally therethrough integrally associated with said base, and a substantially solid non-porous cement lining encircling said longitudinally extending opening.

2. In concrete conduit of the continuous type, the combination, which comprises a continuous concrete base slab providing a permanent foundation, a square conduit with a circular opening extending longitudinally therethrough integrally associated with said base, and a substantially solid non-porous gelatinous cement lining encircling said longitudinally extending opening.

ALEXANDER GIANNOPULOS.

REFERENCES CITED

The following references are of record in the file of this patent:

UNITED STATES PATENTS

| Number | Name | Date |
|---|---|---|
| 626,088 | Paine et al | May 30, 1899 |
| 1,180,472 | Clark | Apr. 25, 1916 |
| 1,600,353 | Nose | Sept. 21, 1926 |
| 1,801,758 | Sinclair | Apr. 21, 1931 |
| 1,843,799 | Blattler | Feb. 2, 1932 |